(12) United States Patent
Mousavi et al.

(10) Patent No.: US 9,865,410 B2
(45) Date of Patent: Jan. 9, 2018

(54) METHODS, SYSTEMS, AND COMPUTER READABLE MEDIA FOR TOPOLOGY CONTROL AND SWITCHING LOADS OR SOURCES BETWEEN PHASES OF A MULTI-PHASE POWER DISTRIBUTION SYSTEM

(71) Applicant: ABB Schweiz AG, Baden (CH)

(72) Inventors: Mirrasoul J. Mousavi, Cary, NC (US);
Dmitry Ishchenko, Cary, NC (US)

(73) Assignee: ABB Schweiz AG (CH)

( * ) Notice: Subject to any disclaimer, the term of this patent is extended or adjusted under 35 U.S.C. 154(b) by 785 days.

(21) Appl. No.: 14/037,344

(22) Filed: Sep. 25, 2013

(65) Prior Publication Data

US 2015/0084434 A1 Mar. 26, 2015

(51) Int. Cl.
*H01H 35/00* (2006.01)
*H01H 83/00* (2006.01)
(Continued)

(52) U.S. Cl.
CPC .............. *H01H 9/54* (2013.01); *H02J 3/26* (2013.01); *H02M 5/458* (2013.01); *H01H 19/00* (2013.01);
(Continued)

(58) Field of Classification Search
CPC .. H02M 7/49; H02M 3/335; H02M 2001/008; H04M 3/22; H04M 1/24; H04L 5/00; H04B 1/006
(Continued)

(56) References Cited

U.S. PATENT DOCUMENTS

| 5,216,574 A | 6/1993 | Marmonier |
| 5,406,186 A * | 4/1995 | Fair ........................... H02P 1/26 310/159 |

(Continued)

FOREIGN PATENT DOCUMENTS

| CA | 2 086 650 A1 | 7/1994 |
| DE | 10 2011 078 047 A1 | 12/2012 |

(Continued)

OTHER PUBLICATIONS

ABB Inc. "LV Power Converter Products; PCS100 AVC, 160 kVA to 30 MVA; Active Voltage Conditioner," Product Brochure, pp. 1-4 (Copyright 2011).

(Continued)

*Primary Examiner* — Rexford Barnie
*Assistant Examiner* — Jagdeep Dhillon
(74) *Attorney, Agent, or Firm* — Taft, Stettinius & Hollister LLP (57) ABSTRACT

A switching system for switching between phases in a multi-phase power distribution system includes a switch for selectively connecting a lateral line to feeder conductors of different phases in a multi-phase power distribution system. Feeder terminals of the switch are configured to connect to feeder conductors of the multi-phase power distribution system. At least one output terminal of the switch is configured to connect to the lateral line. The feeder terminals are spaced about the body of the switch. A shaft and a rotatable contact member extending radially from the shaft are configured for rotating within the switch body to selectively connect the at least one output terminal to any one or more of the feeder terminals. At least one controller operates the switch to selectively change connection of the lateral line between the feeder conductors.

23 Claims, 7 Drawing Sheets

(51) Int. Cl.
*H01H 9/54* (2006.01)
*H02M 5/458* (2006.01)
*H02J 3/26* (2006.01)
*H01H 19/00* (2006.01)

(52) U.S. Cl.
CPC ............. *Y02E 40/50* (2013.01); *Y10T 307/74* (2015.04); *Y10T 307/766* (2015.04)

(58) Field of Classification Search
USPC ..... 307/116, 112, 64, 66, 80, 109; 379/1.04, 379/15.03, 22.04, 27.01; 340/646; 324/140 R; 363/20, 37; 370/297; 200/339
See application file for complete search history.

(56) References Cited

U.S. PATENT DOCUMENTS

| | | | |
|---|---|---|---|
| 5,604,385 A | 2/1997 | David et al. | |
| 6,339,201 B1* | 1/2002 | Balaban | H01H 23/00 200/339 |
| 6,960,844 B1 | 11/2005 | Al-Hosini | |
| 7,064,458 B2* | 6/2006 | Wittner | H02J 3/005 307/43 |
| 7,242,110 B2 | 7/2007 | Matsumoto et al. | |
| 7,903,790 B2* | 3/2011 | Hart | H04M 3/305 379/1.04 |
| 2003/0193253 A1* | 10/2003 | Arimitsu | B60L 15/02 310/114 |
| 2007/0153555 A1* | 7/2007 | Stulz | H02M 7/49 363/20 |
| 2008/0106425 A1* | 5/2008 | Deaver | G01R 19/16547 340/646 |
| 2012/0074779 A1 | 3/2012 | Black et al. | |
| 2012/0078428 A1* | 3/2012 | Henderieckx | H02J 3/26 700/292 |
| 2012/0175951 A1* | 7/2012 | Pamulaparthy | H02J 3/26 307/11 |
| 2013/0062942 A1* | 3/2013 | Hantschel | H02J 7/35 307/19 |
| 2013/0176753 A1* | 7/2013 | Swamy | H02M 1/4216 363/37 |
| 2013/0208515 A1* | 8/2013 | Swamy | H02M 1/36 363/37 |
| 2014/0036744 A1* | 2/2014 | Zeng | H04L 5/00 370/297 |

FOREIGN PATENT DOCUMENTS

EP 2 019 467 A1 6/2009
WO WO 2013/006273 A2 1/2013

OTHER PUBLICATIONS

Notification of Transmittal of the International Search Report and the Written Opinion of the International Searching Authority, or the Declaration for International Patent Application No. PCT/US2014/053013 (dated Feb. 6, 2015).

* cited by examiner

METHODS, SYSTEMS, AND COMPUTER READABLE MEDIA FOR TOPOLOGY CONTROL AND SWITCHING LOADS OR SOURCES BETWEEN PHASES OF A MULTI-PHASE POWER DISTRIBUTION SYSTEM

TECHNICAL FIELD

The subject matter described herein relates to power distribution and topology control. More particularly, the subject matter described herein relates to methods, systems, and computer readable media for topology control and switching loads or sources between phases of a multi-phase power distribution system.

BACKGROUND

Power distribution networks and circuits are traditionally designed and operated as a multi-phase AC feeder circuit serving AC or DC single-phase, double-phase or three-phase loads. Most commonly, distribution feeders emanating from power substations include three-phase primary lines with multi-phase branches or lateral lines along the feeder backbone to serve plural multi-phase or single-phase end users and loads. The feeder line may be sectionalized by switches and line reclosers. In addition, the lateral lines that connect loads to the feeders may be fused. However, the operation of the fuses to isolate the loads is typically not controllable either remotely or locally.

While the opened or closed status of a feeder switch is controllable, the connection between a feeder conductor and a lateral line is fixed and generally not controllable. Therefore, these current mechanisms for topology control from sources to lateral lines are limited to three-phase configurations and to discrete open and close operations in multi-phase circuits.

Many loads are only connected to a subset of the phases of a feeder. For example, the source may have three-phases, often referred to as A, B, and C phases. In the case of single-phase loads, some loads may be connected to the A phase, others may be connected to the B phase, and still others may be connected to the C phase. The connections between the loads and the source phases are typically created at the time the loads are brought into service. However, because the power demanded by various loads dynamically changes, it is desirable to find a mechanism to automatically and efficiently re-balance loads among phases. Similarly, in the case of a feeder line fault on a single phase, it may be desirable to automatically and efficiently switch loads connected to the feeder on which the fault occurred to other phases. The switching of loads to other phases may be temporary while repairs are being made to the faulted lines. Once repairs are made, it is desirable to automatically and efficiently switch loads back to the repaired phase.

Mechanisms for rebalancing loads among phases in multi-phase power distribution systems have been proposed. For example, one proposed mechanism uses separate phase changeover switches for switching between each pair of phases and switches based on zero phase current detection. Another mechanism uses a summing circuit that receives the three-phase power, converts the power to a single phase, and then distributes the single-phase power among the loads. Other phase load balancing solutions use expensive combinations of power electronics and transformers to achieve load balancing between phases. Due to their expense and complexity, such solutions are unsuitable for widespread deployment at the lateral line level.

Still another problem with proposed solutions to switch between phases is the requirement to switch to an intermediate phase when transitioning between two phases. For example, some switch designs when switching between phases A and C require that the switch make a temporary connection with the B phase when transitioning from A to C. The temporary connection to the B phase may cause transients on both the A and B phases, which are undesirable.

It is also desirable to have an efficient way for prosumers to automatically and efficiently switch between phases. A prosumer is an entity, such as a residence, that sometimes produces excess power that could be supplied to the grid and at other times consumes power supplied from the grid. When the prosumer produces excess power, it is desirable to switch the prosumer to the feeder phase most in need of the excess power. When the prosumer is consuming power, it is desirable to switch the prosumer to the feeder phase most capable of supplying the needed power.

Accordingly, there is an unmet need for a cost-effective mechanism that achieves greater topology control and phase selectivity in multi-phase circuits for power distribution systems.

SUMMARY

The subject matter described herein includes methods, systems, and computer readable media for topology control and switching loads or sources between phases of a multi-phase power distribution system. One exemplary system includes a switch for selectively connecting a lateral line to feeder conductors of different phases in a multi-phase power distribution system. Feeder terminals of the switch are configured to connect to feeder conductors of the multi-phase power distribution system. At least one output terminal of the switch is configured to connect to the lateral line. The feeder terminals are spaced about the body of the switch. A shaft and a rotatable contact member extending radially from the shaft are configured for rotating within the switch body to selectively connect the at least one output terminal to any one or more of the feeder terminals. At least one controller operates the switch to selectively change connection of the lateral line between the feeder conductors.

The subject matter described herein for topology control and switching loads or sources between phases of a multi-phase power distribution system may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1A:
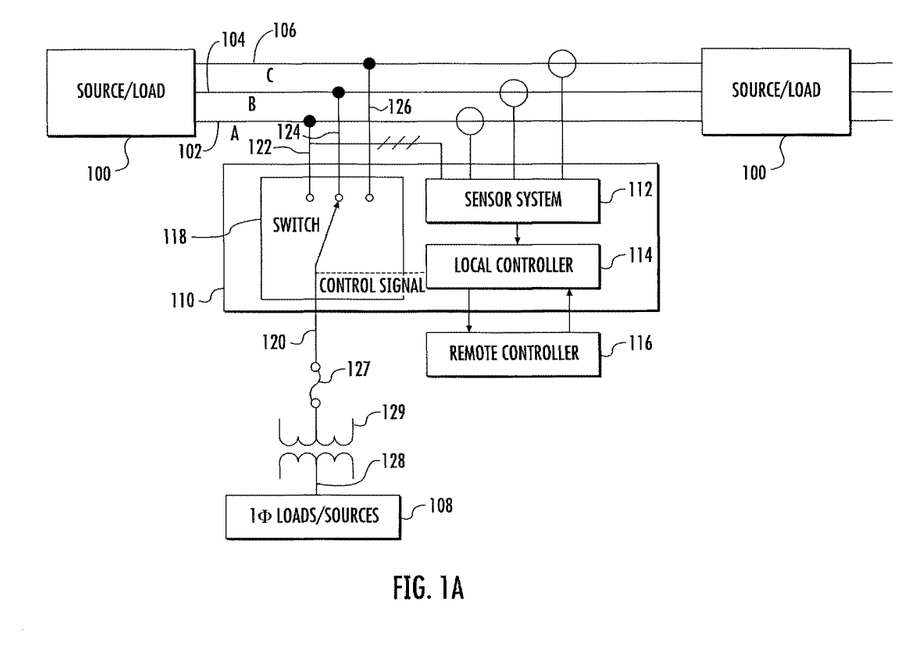
FIG. 1A is a schematic diagram illustrating a system for selectively topology control and switching loads or sources between phases of a multi-phase power distribution system according to an embodiment of the subject matter described herein.

The subject matter described herein includes methods, systems, and computer readable media for topology control and switching loads or sources between phases of a multi-phase power distribution system. FIG. 1A is a schematic diagram illustrating a system topology control and switching loads between phases of a multi-phase power distribution system according to an embodiment of the subject matter described herein. Referring to FIG. 1A, three-phase sources or loads 100 supply power to or consume power from different phase feeder conductors 102, 104, and 106, with the phases being labeled A, B, and C, respectively. Single-phase loads or sources 108 may need to draw power from or supply power to one of the phases. For example, single-phase loads or sources 108 may be associated with a building that consumes single-phase power when the building functions as a load. The building may also function as a source, if the building has power generation capabilities, such as photovoltaic power generation capabilities. In another example of an entity that functions as both a load and a source, a residence may function as a load when charging an electric vehicle (EV). When the electric vehicle is fully charged and not in use, the battery from the electric vehicle may be used to supply power back into the grid.

Rather than simply fixedly connecting loads or sources 108 to one of the feeder conductors 102, 104, and 106, a switching system 110 is provided to automatically and selectively switch connection of loads or sources 108 between different phase feeder conductors 102, 104, and 106 for load balancing between feeder phases and/or other purposes, such as alternate sourcing during outages. In the illustrated example, switching system 110 includes a sensor system 112 that measures current or other indication of loading on feeder conductors 102, 104, and 106 and conditions associated with loads or sources 108. For example, sensor system 112 may measure the current on each feeder conductor 102, 104, and 106 and report the measured currents as output. Sensor system 112 may also measure current drawn by loads or sources 108 to detect faults or other conditions. The output of sensor system 112 may be fed into a local controller 114 that is capable of performing computations to determine the relative loading of feeder conductors 102, 104, and 106 and the effect of switching loads or sources 108 between feeder conductors 102, 104, and 106. Controller 114 may also be capable of controlling its local switch 118 to effect switching of loads or sources 108 between phases. A remote controller 116 may also provide coordinating input to local controller 114 to switch loads or sources 108 between phases.

In one example, if the relative loading of feeder conductors 102, 104, and 106 becomes imbalanced with respect to a specified criteria, sensor system 112 may sense this imbalance and trigger local controller 114 to cause switch 118 to move the connection of output terminal 120 between feeder conductor connectors 122, 124, and 126 and thereby switch the connection of loads or sources 108 between phases of the power distribution system to reduce the magnitude of the imbalance.

In another scenario, when a fault occurs at one lateral line connected to one of the feeder conductors 102, 104, or 106, that lateral line may be isolated from the feeder to which it is connected by operation of a fault current interruption device 127 connected between the lateral line and its feeder. The loss of a lateral line on one phase may create an imbalance between the phase on which the fault occurs and the remaining phases. In response to such an occurrence, switching systems 110 may function to switch other lateral lines between phases to rebalance the relative loading between the phases as much as possible.

In another example, if a fault occurs on one of feeder conductors 102, 104, and 106, protection device on the feeder conductor may operate to disconnect the feeder conductor from sources 100. To maintain service continuity, switching system 110 connecting the lateral line to the isolated feeder conductor may operate to move the lateral line and associated loads or sources connected to the isolated feeder conductor to other feeders or feeder conductors.

In a peer-to-peer control example, a controller 114 connecting one lateral line to a feeder may receive input from another controller 114 connecting another lateral line to a different feeder and may switch its loads between feeders in response to the input. For example, the lateral line associated with the controller sending the input may be connected to A phase and may supply power to charge one or more electric vehicles. The controller connected to the EVs may determine that the lateral line served by another controller 114 connected to the C phase has excess power to supply to the grid. In such a scenario, the controller serving the lateral line needing the power may communicate directly with the controller serving the lateral line with excess power to supply to effect the switching of the lateral line with the excess power from the C phase feeder to the A phase feeder.

As illustrated in FIG. 1A, a fault current interruption device 127 may be located between switching system 110 and lateral line 128 or integrated as part of switching system 110. A protection device may also be located on each line 122, 124, and 126 connecting switching system 110 to feeder conductors 102, 104, and 106. Fault current interruption device 127 may be a fuse, a circuit breaker, a recloser, or any other mechanism for isolating lateral line 128 from feeder conductors 102, 104, and 106 in response to a fault condition on lateral line 128 or feeder conductors 102, 104, 106. Switching system 110 may need protection on both the lateral line side and the feeder conductor side because switching system 110 may be bidirectional. It should be noted that fault current interruption device 127 may be internal or external to switch 118.

An isolation transformer 129 may be provided between the distribution feeder system and lateral line 128. Switching system 110 may preferably operate at like voltage levels where the input and output voltages are the same, step up or step down transformers may not be required between switching system 110 and lateral line 128. Voltage transformation may be included and/or required at the individual load or source level as required by the particular loads or sources.

It should be noted that lateral line 128 may connect to multiple loads or sources 108. As such, when switch 118 operates, lateral line 128 and all of its connected loads or sources may be switched between phases of the multi-phase power distribution system.

Figure 1B:
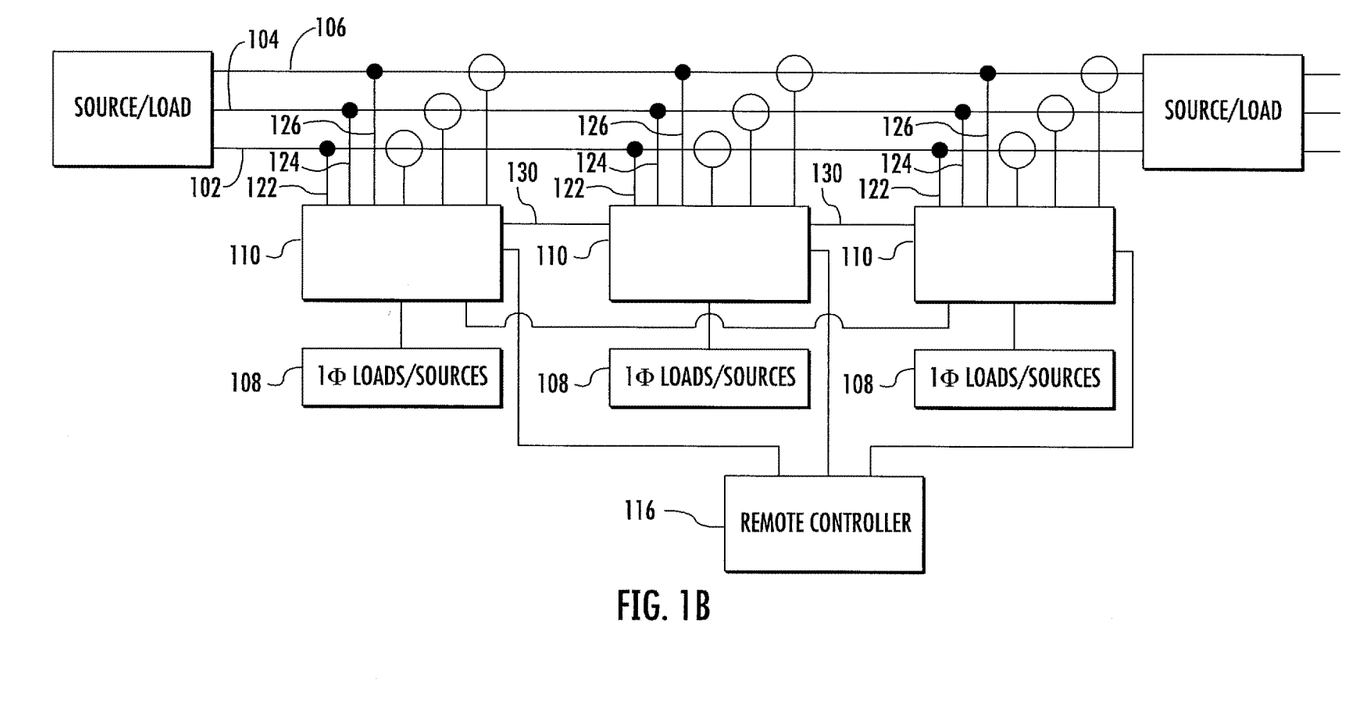
FIG. 1B is a schematic diagram illustrating a plurality of systems for topology control and switching loads or sources between phases of a multi-phase power distribution system where control is peer to peer with centralized remote control coordination according to an embodiment of the subject matter described herein.

It should also be noted that although a single switching system 110 for selectively and automatically moving loads or sources between phases in a multi-phase power distribution system is illustrated in FIG. 1A, the subject matter described herein is not limited to using a single switching system 110. In an alternate embodiment, because of the low cost nature of each switching system 110, which will be explained in more detail below, a plurality of systems 110 may be deployed such that each lateral line may include its own switching system 110 to move each lateral line and the loads or sources connected to the lateral line between phases. FIG. 1B illustrates such an embodiment. In FIG. 1B, each switching system 110 may be configured as illustrated in FIG. 1A. Each switching system 110 may operate autonomously to switch lateral lines between phases of the power distribution system based on its own sensor inputs. Remote controller 116 may also coordinate switching between phases of autonomous switching systems 110 to avoid conflicts and reduce hysteresis. For example, if one switching system 110 detects a current imbalance on feeder conductors 102, 104, and 106 and switches its lateral line between phases to balance the loading, remote controller 116 may operate to prevent the other switching systems 110 from switching between phases until the effect of the first phase switch has been determined.

Connections 130 between switching systems 110 in FIG. 1B are peer-to-peer connections between local controllers 114 that may be achieved by wired or wireless communications. Peer-to-peer connections 130 may be used by local controllers 114 to effect peer-controlled switching of lateral lines between feeder phases, as described above with respect to FIG. 1A.

Figure 1C:
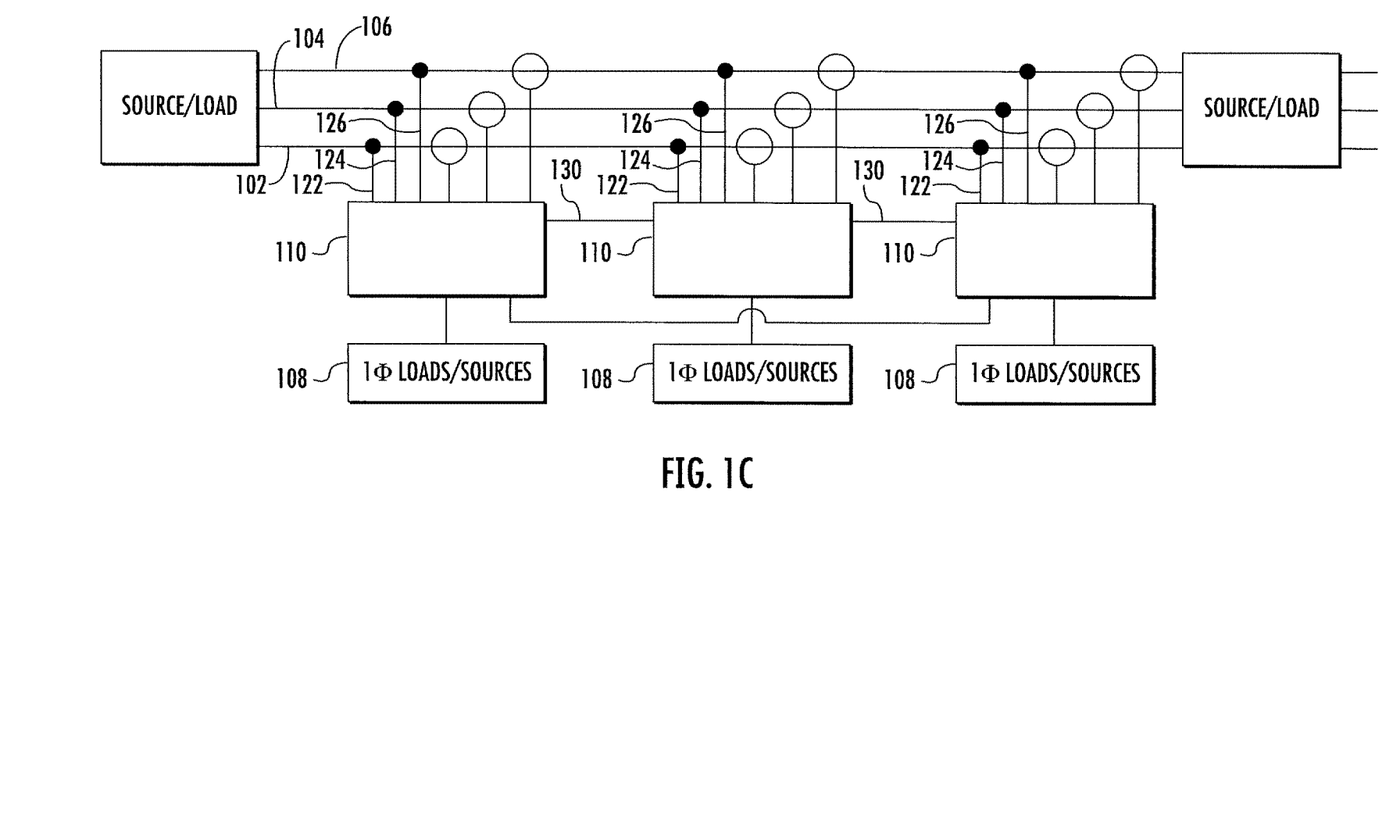
FIG. 1C is a schematic diagram illustrating a plurality of systems for topology control and switching loads or sources between phases of a multi-phase power distribution system where control is peer to peer without centralized remote according to an embodiment of the subject matter described herein.

In yet another peer to peer embodiment, peer to peer control of switching systems may be implemented without centralized remote control coordination. Such an embodiment is illustrated in FIG. 1C. In FIG. 1C, each switching system 110 includes its own local controller that communicates with peer local controllers of other switching systems 110 to determine when to switch loads or sources between feeder phases. The switching decisions may be made locally based on local loading input and input from peers. In this case, the switching decisions can be made without centralized control coordination. However, as illustrated in FIG. 1B, utilizing a combination of peer to peer and centralized remote control is within the scope of the subject matter described herein.

In FIGS. 1B and 1C, each switching system 110 is connected to one other peer switching system 110. However, the subject matter described herein is not limited to such an embodiment. In general, when peer based control is implemented, each switching system 110 may be connected to one or more peer switching systems for the purpose of exchanging peer-based switching control commands and load status information.

Figure 2:
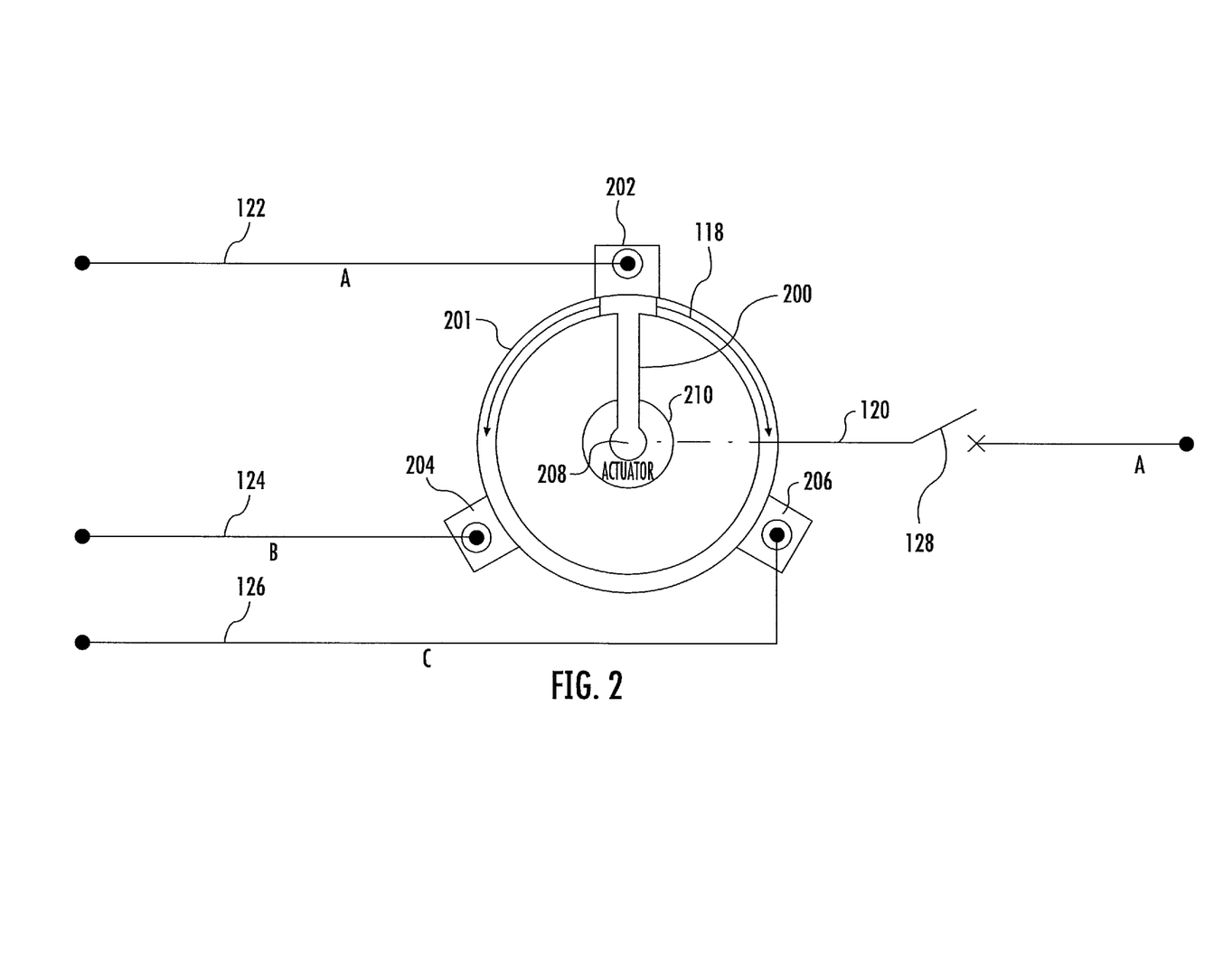
FIG. 2 is a schematic diagram illustrating one embodiment of a switch for topology control and switching loads or sources between phases of a multi-phase power distribution system according to an embodiment of the subject matter described herein.

FIG. 2 is a schematic diagram illustrating one embodiment of a switch 118 for switching a lateral line between phases of a multi-phase power distribution system according to an embodiment of the subject matter described herein. Referring to FIG. 2, switch 118 is a mechanical rotary switch with a rotatable contact member 200 that selectively connects output terminal 120 to one of a plurality of feeder terminals 202, 204, and 206 that are circumferentially spaced about a cylindrical switch body 201. In the illustrated example, rotatable contact member 200 extends radially outward from a shaft 208 that rotates both clockwise and counterclockwise to switch loads or sources between feeder phases. An actuator 210 may control the rotation of shaft 208. Actuator 210 may be controlled by the control signal illustrated in FIG. 1A. One example of a suitable device that may be used for actuator 210 is a stepper motor.

When actuator 210 receives a control signal to switch between phases, rotatable contact member 200 may rotate to break the connection between one feeder conductor and the output terminal and make connection between another feeder conductor of a different phase and the output terminal. When rotating between terminals, rotatable contact member 200 may be in contact with switch body 201, which may be non-conductive, at least along the portion that contacts rotatable contact member 200 as it moves between feeder terminals 202, 204, and 206. A brush assembly (not shown) may ride on shaft 208, which may also be conductive and connected to rotatable contact member 200. The brush assembly may connect rotatable contact member 200 to output terminal 120. When rotatable contact member 200 reaches the position of a feeder terminal 202, 204, or 206 connected to the desired phase feeder conductor, actuator 210 stops and locks the rotation of rotatable contact member 200 and thereby completes the switching of the lateral line between feeder phases. Actuator 210 may include permanent magnets positioned at the desired stops to lock rotatable contact member 200 in position.

One aspect of switch 118 is the ability to switch between phases without requiring a temporary connection with an intermediate phase during switching. For example, because rotatable contact member 200 rotates in both the clockwise and counter-clockwise directions, in a three-phase system, switching from the A phase to the C phase without an intermediate connection to the B phase, from the B phase to the A phase without an intermediate connection to the C phase, and from the C phase to the B phase without an intermediate connection to A phase are all possible. Switching without requiring the intermediate phase connection reduces transients and eliminates reliability and power quality concerns over systems that require intermediate connections.

Figure 3:
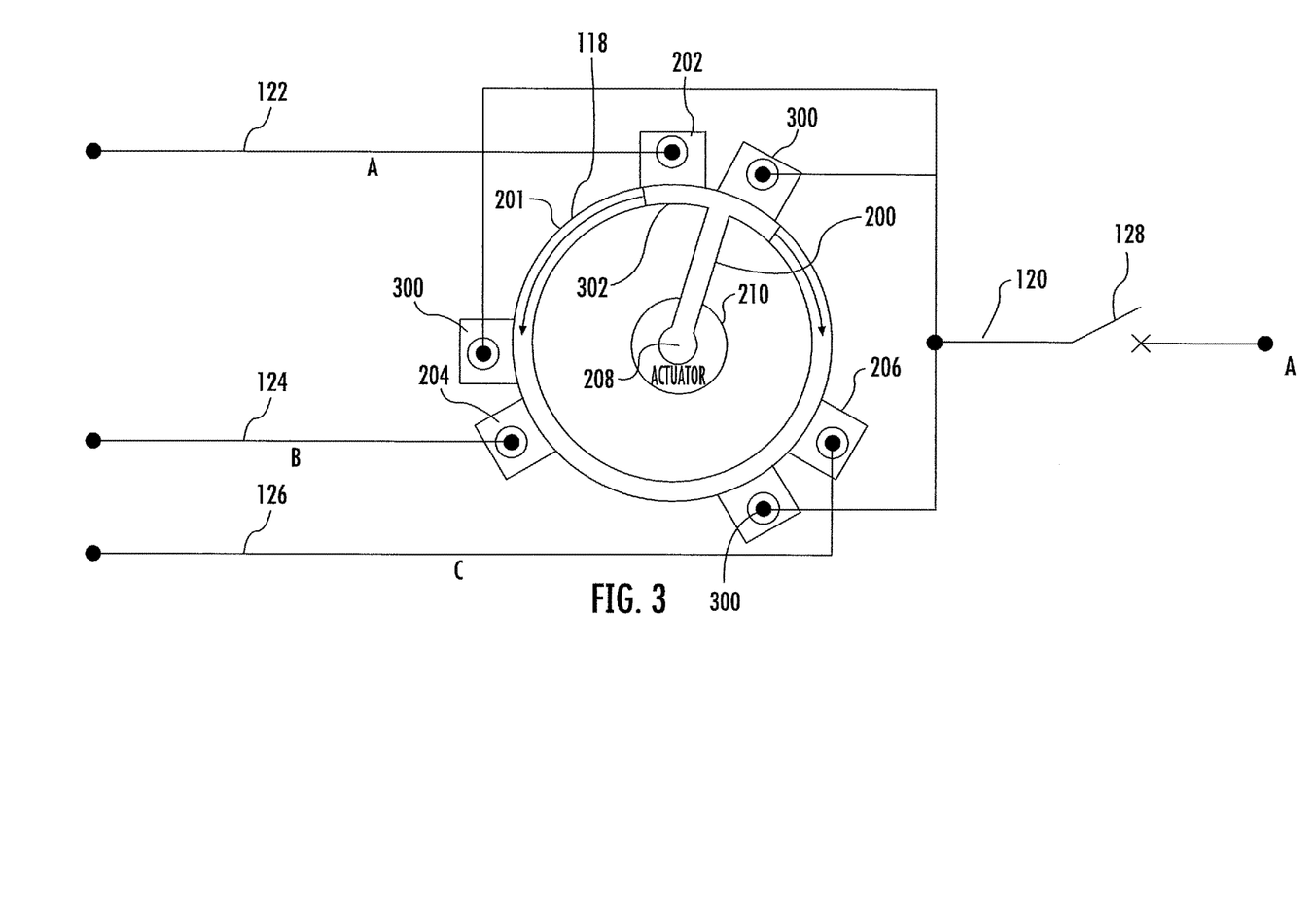
FIG. 3 is a diagram illustrating an alternate embodiment of a switch for topology control and switching loads or sources between phases of a multi-phase power distribution system according to an embodiment of the subject matter described herein.

FIG. 3 is a schematic diagram illustrating an alternate design of switch 118. In FIG. 3, the need for shaft brushes to connect the output terminal to the desired input terminal is eliminated, but more terminals are positioned on the body of switch 118. In FIG. 3, output terminals 300 are each paired with a different feeder terminal 202, 204, and 206. Rotatable contact member 200 includes an elongated end portion 302 that selectively connects one of the output terminals 300 to one of the different phase feeder terminals 202, 204, and 206. In the illustrated example, elongated end portion 302 includes an arcuate profile that corresponds or conforms to the path in switch body 201 within which elongated end portion 302 rotates. Elongated end portion 302 is bisected by the radially extending portion of rotatable contact member 200 and is dimensioned to span the circumferential spacing of a feeder terminal-output terminal pair. The shape of elongated end portion 302 and the contact surfaces of feeder terminals 202, 204, and 206 may be shaped and edged to reduce transients and arcing.

In operation, when actuator 210 receives a control signal to switch the lateral line between phases, actuator 210 rotates rotatable contact member 200 to short a different output terminal 300—feeder terminal 202, 204, or 206 pair. The connection is made when elongated end portion 302 spans the circumferential distance between an output terminal-feeder terminal pair.

Figure 4:
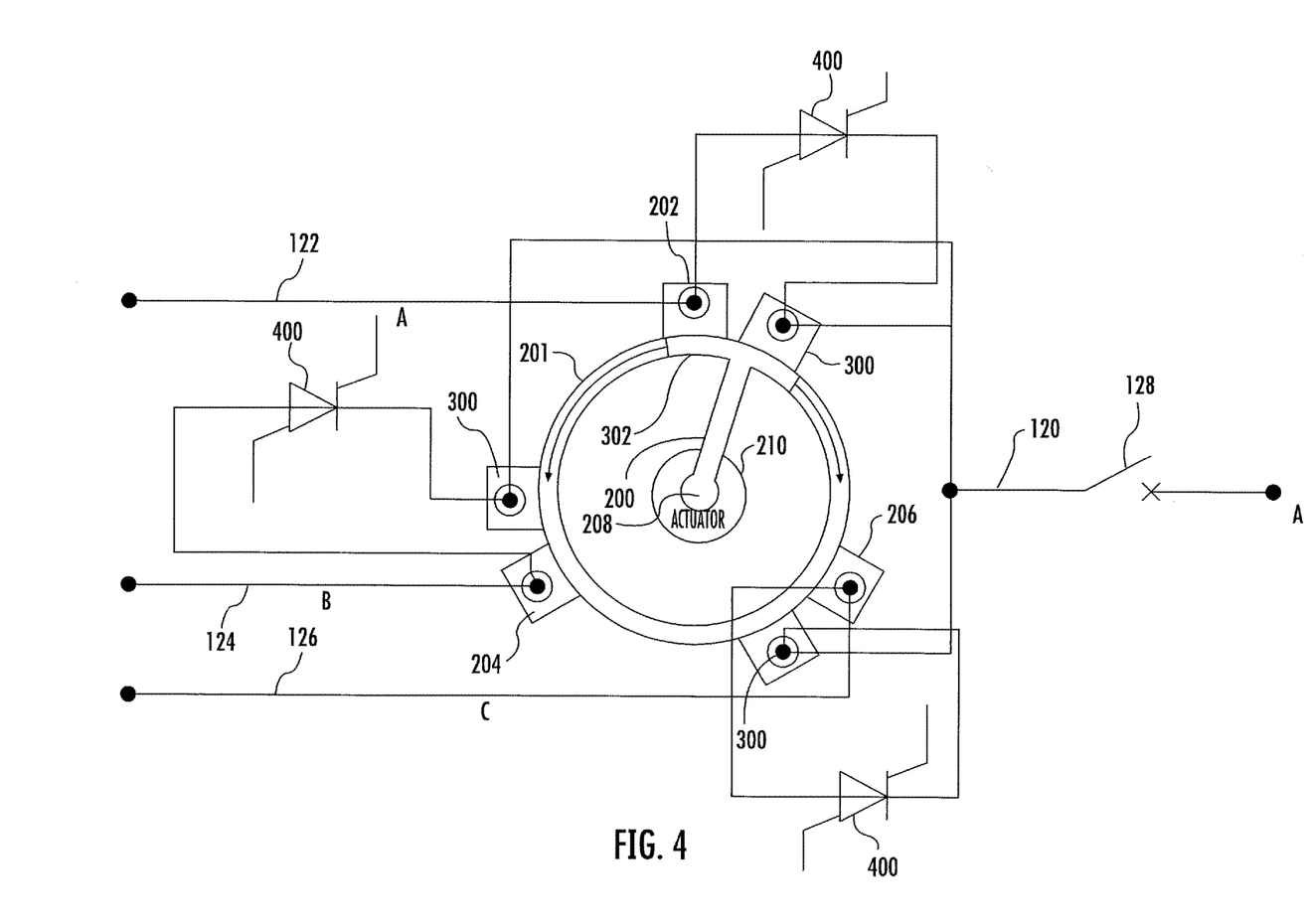
FIG. 4 is a schematic diagram illustrating yet another embodiment of a switch for topology control and switching loads or sources between phases of a multi-phase power distribution system according to an embodiment of the subject matter described herein.

FIG. 4 illustrates yet another alternate design for switch 118. The mechanical design of switch 118 illustrated in FIG. 4 is the same as that illustrated in FIG. 3. The design illustrated in FIG. 4 is intended to smooth the transition between phases by providing power semiconductor devices 400 (a.k.a. controllable switches) that maintain the connection with one phase while rotatable contact member 200 is moving between phases. In FIG. 4, power semiconductor devices 400 may comprise thyristors, triacs, or active turn-off devices like IGBTs individually sized or stacked up in series to support the required voltage rating. Any controllable semiconductor device capable of opening and closing a connection between terminals at the desired voltages may be used without departing from the scope of the subject matter described herein. Provisions may be made to manage voltage spikes, e.g., via parallel metal oxide varistors (MOVs) (not shown), and to control the transient response of the device.

In FIG. 4, when rotatable contact member 200 rotates to break the connection of the lateral line with one phase, the semiconductor device 400 associated with the original phase is turned on to maintain the connection between the lateral line and original phase. When rotatable contact member 200 is about to make the connection with the new phase, the semiconductor device 400 associated with the original phase switches off or is switched off to break the connection with the original phase. Thus, the embodiment illustrated in FIG. 4 provides smoother transitions between phases and reduces the phase open period.

In FIGS. 2-4, terminals 202, 204, 206 and 300 are circumferentially spaced about the body of switch 118. In one exemplary implementation, terminals 202, 204, 206, and 300 may be located in the same axial plane. In an alternate implementation, any two or more of terminals 202, 204, 206, and 300 may be located in different axial planes. In implementations where terminals 202, 204, 206, and 300 are located in different axial planes, rotatable contact member 200 may be capable of moving axially to move between terminal contact positions. In yet another alternate implementation, terminals 202, 204, 206, and 300 may be non-circumferentially spaced and the end of rotatable contact member 200 may move in a non-circumferential path to switch between phases.

Figure 5:
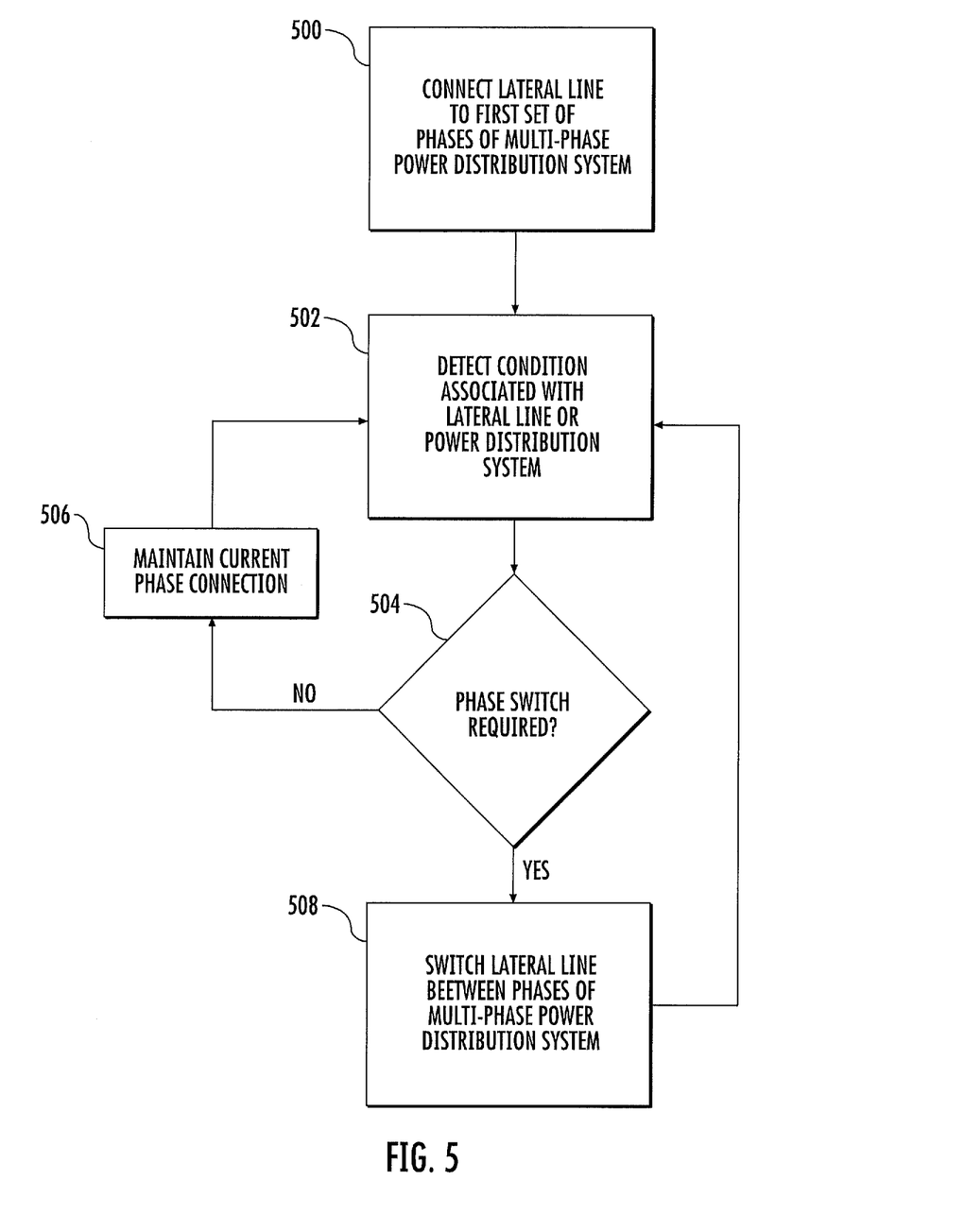
FIG. 5 is a flow chart illustrating an exemplary process for topology control and switching loads or sources between phases of a multi-phase power distribution system according to an embodiment of the subject matter described herein.

FIG. 5 is a flow chart illustrating exemplary overall steps for implementing the subject matter described herein. Referring to FIG. 5, in step 500, a lateral line is connected to a first set of phases of a multi-phase power distribution system. For example, if the lateral line serves single-phase loads, the lateral line may be connected to the A phase of a multi-phase distribution system using a switch 118 as described above. In step 502, a condition is detected associated with the lateral line or one of the feeders in the multi-phase distribution system. In one example, the condition may be an imbalance of load current between phases of the multi-phase distribution system. In another example, the condition may be a signal from lateral line that the one or more loads on the lateral line are functioning as sources with excess power to supply to the grid. In such a case, controller 116 may determine the phase most in need of the excess power. In yet another example, the controller 116 may determine an alternate phase to power load in the event of a loss of voltage and/or outage in the primary phase nominally feeding the load.

In step 504, it is determined whether the condition requires switching of the lateral line between phases. In the load balancing example, in response to a feeder conductor loading imbalance, controller 114 or 116 may move lateral lines between phases to balance power among the phases if the imbalance exceeds a threshold level. In the example where a lateral line becomes a source, controller 116 may control the local switch 118 to switch the source to the phase most in need of the excess power. If switching is not required or overridden through a remote or peer-to-peer coordination process, control proceeds to step 506 where the current connection is maintained until another condition is detected.

If it is determined that the condition requires switching between phases, control proceeds to step 508 where the lateral line is switched between phases of the multi-phase power distribution system. Switching the lateral line between phases may include breaking the connection of the lateral with one set of phases and moving the connection of the lateral line to a different set of phases automatically in response to a control signal as described above. Switching between phases may include controlling the rotation of rotatable contact member 200 to switch connection of the output terminal of the switch between the feeder terminals, where the switching occurs without connection to an intermediate feeder terminal. In all cases, special precautions are taken to avoid a potential line to line connection resulting in a line to line fault. Break-before-make scenarios are therefore preferred over the alternatives, e.g., make-before-break. After step 508, control returns to step 502 where conditions of lateral lines and/or the remainder of the power distribution system are monitored to determine whether further phase switching is required.

Although in the examples described above, each switching system 110 switches single-phase loads or sources between phases in a three-phase system, the subject matter described herein is not limited to such an embodiment. In general, each switching system 110 may switch an M phase load or source between phases in an N phase feeder system, where N and M are integers. For example, switching system 110 may be used to switch a two-phase source from phases A and B in a three-phase system to phases B and C in the three-phase system. In addition, while switching system 110 is described above as being useful for topology control, switching system 110 may incorporate fault/load interruption capabilities to function as a universal switch.

Exemplary Use Cases

The following describes exemplary use cases for the methods and systems described herein for topology control and switching loads sources between phases of a multi-phase power distribution system according to an embodiment of the subject matter described herein.

Active distribution systems feature an emerging breed of loads which are no longer passive consumer of electric power but may be more appropriately called "prosumers". As stated above, a prosumer is a business or other entity that produces and consumes electric power and takes an active role in demand response programs when financial incentives make a compelling case to do so. Simply put, prosumers may be composed of the legacy passive loads with local generation that generates electricity locally and may sell it back to the grid at appropriate times. A typical example involves a residential consumer who owns an electric car, or has a photovoltaic (PV) array or a small windmill and is able to generate kilowatts of power for local consumption, community consumption in a microgrid, or backfeed to the grid. Switching systems 110 may be used to selectively connect a prosumer source with surplus power to the phase of the grid most in need of such power. For example, if a lateral line connected to a photovoltaic array is connected to the A phase and the B phase is currently in need of energy, switching system 110 may operate to selectively move the connection of the lateral line with the photovoltaic array from the A phase to the B phase.

A primary driver for enhanced topology control in active distribution systems is load balancing. Utility operators monitor loading levels on a continuous basis or periodically. Per new construction projects, field changes and revisions or emergency work is scheduled. Temporary phase changes and switching may occur in the field until a permanent field change is completed. Switching systems 110 may be utilized to make the temporary phase changes between loads and feeder phases until the permanent field phase is completed. With circuit expansion projects, there may be some areas where a new single-phase run (e.g., an "A" phase run) meets or is to be connected to another single-phase run (e.g., a "C" phase). This scenario would then require one of the two phases to be reconfigured to one or the other phase. For example, to connect an A phase supplied from one substation to a C phase supplied from another substation, either the A phase would have to be reconfigured to a C phase or the C phase would have to be reconfigured to an A phase before making the interconnection between runs. A switching system 110 between the A or C phase and its associated substation may be used to effect the phase reconfiguration before making the interconnection between the runs.

Load balancing is particularly a challenging requirement to meet in active distribution systems with single-phase connections. With the ever-increasing growth and integration of distributed energy resources (DER) such as solar PV, electric vehicles, and energy storage, a traditional passive consumer turns into a prosumer, taking an active role in both production and consumption of electric power. These system resources are primarily single-phase residential entities that interact with the feeder to which they are permanently connected. The ability to control the topology of these permanent connections and phase-selectivity offers flexible control options to manage and balance the bi-directional flow of power in each phase that changes instantaneously. By using switching systems 110 to flexibly connect a lateral line to the feeder system, when the lateral line changes from a consumer to a prosumer, the switching system 110 can operate to flexibly change the lateral line between feeder phases on an as-needed basis.

Another important use case for per-phase topology control enhances outage management and power routing. It is often cited that about 80% of distribution faults are single-phase faults involving the neutral wire or ground. With the ability to manage and control branch connectivity on a real-time and per-phase basis, the operators can coordinate and restore the service to certain single-phase loads from healthy phases until repairs are done or as long as the safety measures allow it. For example, when a single-phase ground fault occurs on the feeder, switching systems 110 may operate to move single-phase loads connected to the feeder on which the ground fault occurred to other phases while the fault condition is being cleared. Once the fault condition is cleared, switching systems 110 may operate to switch the loads back to their original phase.

Other use cases for single-phase switching and topology control involve other distribution automation schemes. Fault detection, isolation, and service restoration function is currently performed on a three-phase basis. This means that all three-phases of the affected distribution circuit segment will experience at least one or more power interruptions at the isolation step even in the case of a single-phase fault. Additionally, after the faulted segment is isolated by the three-phase fault isolation and restoration scheme, all three-phases of the affected segment are disconnected even though it would still be possible to reconnect the unaffected phases if per-phase switching were available. This capability has the potential to minimize the impact of outages on the utility customers. Using switching systems 110 to move loads from faulty phases to healthy phases, the number of loads affected by an outage can be reduced and outages can be managed on a per-phase basis.

In should be noted that switching systems 110 are preferably configured to operate at the medium voltage level (5 kV to 35 kV) between the distribution feeders and the lateral lines where the input and output voltages are at the same level. As such, switching systems 110 may not require step down transformers to change the voltage level and are thus less expensive than systems designed to operate between the distribution feeders and the loads where the input and output voltages are not the same and transformers are required.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A switching system for topology control and switching between phases in a multi-phase power distribution system, the switching system comprising:
    a first switch for selectively connecting a first lateral line to feeder conductors of different phases in a multi-phase power distribution system, the first switch comprising a plurality of feeder terminals configured to connect to the feeder conductors of the multi-phase power distribution system, the first switch further comprising at least one output terminal configured to connect to the first lateral line, and the first switch further comprising a switch body, wherein the feeder terminals are spaced about the switch body, the first switch further comprising a shaft and a rotatable contact member extending radially from the shaft for rotating within the switch body and selectively connecting the at least one output terminal to any one or more of the feeder terminals;

a first controller for operating the first switch to selectively change connection of the first lateral line between the feeder conductors of the multi-phase power distribution system, wherein the first lateral line is connected to a prosumer that consumes and produces energy and the first switch connects the first lateral line to a first feeder conductor of the plurality of feeder conductors;

a second switch for selectively connecting a second lateral line to the feeder conductors of different phases in the multi-phase power distribution system, the second switch comprising a plurality of feeder terminals configured to connect to the feeder conductors of the multi-phase power distribution system, the second switch further comprising at least one output terminal configured to connect to the second lateral line, wherein the second lateral line is connected to a plurality of loads that consume energy and the second switch connects the second lateral line to a second feeder conductor of the plurality of feeder conductors; and a second controller for operating the second switch to selectively change connection of the second lateral line between the feeder conductors of the multi-phase power distribution system, wherein the second controller determines that the first lateral line has excess energy to supply and communicates with the first controller to effect switching of the first lateral line to the second feeder conductor.

2. The switching system of claim 1 wherein the rotatable contact member is configured for bi-directional rotation within the switch body.

3. The switching system of claim 2 wherein the multi-phase power distribution system comprises a three-phase power distribution system and wherein the rotatable contact member is configured to selectively change the connection of the at least one output terminal of the first switch with any one of the feeder terminals to any of the other feeder terminals without making connection with an intermediate feeder terminal.

4. The switching system of claim 1 wherein the at least one output terminal of the first switch is a single output terminal connected to the rotatable contact member.

5. The switching system of claim 4 wherein the single output terminal is connected to the shaft via a brush assembly.

6. The switching system of claim 1 wherein the at least one output terminal of the first switch comprises a plurality of output terminals, each being paired with a respective one of the feeder terminals of the first switch, wherein the rotatable contact member includes an elongated end portion for shorting output terminal-feeder terminal pairs and for moving in response to input from the at least one controller to short different output terminal-feeder terminal pairs.

7. The switching system of claim 6 wherein the elongated end portion has an arcuate profile conforming to a path in the switch body within which the elongated end portion rotates.

8. The switching system of claim 7 wherein the elongated end portion is bisected by a radially extending portion of the rotatable contact member and has a span sufficient to short an output terminal-feeder terminal pair.

9. The switching system of claim 6 wherein the first switch includes a plurality of semiconductor devices connected across each combination of feeder and output terminals, wherein the semiconductor devices maintain an electrical connection between a combination of feeder and output terminals when the rotatable contact member moves to open a connection between the combination of feeder and output terminals and wherein the semiconductor devices turn off before the rotatable contact member creates a connection between another combination of feeder and output terminals.

10. The switching system of claim 9 wherein the semiconductor devices each comprise at least one thyristor.

11. The switching system of claim 1 wherein the first controller is local to the first switch for determining whether to control the first switch to switch connection of the at least one output terminal of the first switch between the feeder terminals of the first switch based on sensor data received by the first controller.

12. The switching system of claim 11 wherein the first controller is configured to communicate with peer local controllers associated with switches other than the first switch to determine whether to switch connection of the at least one output terminal of the first switch between the feeder terminals of the first switch.

13. The switching system of claim 11 comprising a remote controller for communicating with the first controller regarding the determination as to whether to switch connection of the at least one output terminal of the first switch between the feeder terminals of the first switch.

14. The switching system of claim 1 wherein the first controller is configured to determine whether to switch connection of the at least one output terminal of the first switch between the feeder terminals of the first switch based on one of: relative phase loading, overloading, volt/var optimization, maintenance, phase reconfiguration, loss minimization, feeder optimization, outages, feeder faults, and load faults.

15. The switching system of claim 1 wherein the first switch and the first controller are configured to operate at a medium voltage level where the voltage levels on the first lateral line and the feeder conductors are equal.

16. The switching system of claim 1 wherein the feeder terminals of the first switch are located in the same axial plane.

17. The switching system of claim 1 wherein at least some of the feeder terminals of the first switch are located in different axial planes.

18. A method for topology control and switching between phases in a multi-phase power distribution system, the method comprising:

connecting a first lateral line to a first feeder terminal of a first phase of a multi-phase power distribution system via a first switch, the first switch comprising a plurality of feeder terminals configured to connect to the feeder conductors of the multi-phase power distribution system, the first switch further comprising at least one output terminal configured to connect to the first lateral line, and the first switch further comprising a switch body, wherein the feeder terminals are spaced about the switch body, the first switch further comprising a shaft and a rotatable contact member extending radially from the shaft for rotating within the switch body and selectively connecting the at least one output terminal to any one or more of the feeder terminals;

operating the first switch to selectively change connection of the first lateral line between the feeder conductors of the multi-phase power distribution system, wherein the first lateral line is connected to a prosumer that consumes and produces energy and wherein operating the first switch includes using a first controller controlling, using a second controller, a second switch for selectively connecting a second lateral line to the feeder conductors of different phases in the multi-phase power distribution system, the second switch comprising a plurality of feeder terminals configured to connect to the feeder conductors of the multi-phase power distribution system, the second switch further comprising at least one output terminal configured to connect to the second lateral line, wherein the second lateral line is connected to a plurality of loads that consume energy and the second switch connects the second lateral line to a second feeder conductor of the plurality of feeder conductors; and operating, using the second controller, the second switch to selectively change connection of the second lateral line between the feeder conductors of the multi-phase power distribution system, wherein the second controller determines that the first lateral line has excess energy to supply and communicates with the first controller to effect switching of the first lateral line to the second feeder conductor.

19. The method of claim 18 wherein the first controller is local to the first switch and wherein operating the first switch includes utilizing the first controller for determining whether to control the first switch to switch connection of the at least one output terminal between the feeder terminals based on sensor data received by the first controller.

20. The method of claim 18 wherein operating the first switch comprises utilizing first controller local to the first switch configured communicate with peer local controllers associated with switches other than the first switch to determine whether to switch connection of the at least one output terminal of the first switch between the feeder terminals of the first switch.

21. The method of claim 19 wherein operating the first switch comprises utilizing a remote controller for communicating with the first controller regarding the determination as to whether to switch connection of the at least one output terminal of the first switch between the feeder terminals of the first switch.

22. The method of claim 18 wherein operating the first switch comprises determining whether to switch connection of the output terminal of the first switch between the feeder terminals of the first switch based on one of: relative phase loading, overloading, volt/var optimization, maintenance, phase reconfiguration, loss minimization, feeder optimization, outages, feeder faults, and load faults.

23. A non-transitory computer readable medium having stored therein executable instructions that when executed by the processor of a computer control the computer to perform steps comprising:

connecting a first lateral line to a first feeder terminal of a first phase of a multi-phase power distribution system via a first switch, the first switch comprising a plurality of feeder terminals configured to connect to the feeder conductors of the multi-phase power distribution system, the first switch further comprising at least one output terminal configured to connect to the first lateral line, and the first switch further comprising a switch body, wherein the feeder terminals are spaced about the switch body, the first switch further comprising a shaft and a rotatable contact member extending radially from the shaft for rotating within the switch body and selectively connecting the at least one output terminal to any one or more of the feeder terminals;

operating the first switch to selectively change connection of the first lateral line between the feeder conductors of the multi-phase power distribution system, wherein the first lateral line is connected to a prosumer that consumes and produces energy and wherein operating the first switch includes using a first controller controlling, using a second controller, a second switch for selectively connecting a second lateral line to the feeder conductors of different phases in the multi-phase power distribution system, the second switch comprising a plurality of feeder terminals configured to connect to the feeder conductors of the multi-phase power distribution system, the second switch further comprising at least one output terminal configured to connect to the second lateral line, wherein the second lateral line is connected to a plurality of loads that consume energy and the second switch connects the second lateral line to a second feeder conductor of the plurality of feeder conductors; and operating, using the second controller, the second switch to selectively change connection of the second lateral line between the feeder conductors of the multi-phase power distribution system, wherein the second controller determines that the first lateral line has excess energy to supply and communicates with the first controller to effect switching of the first lateral line to the second feeder conductor.

* * * * *